United States Patent
Kim et al.

(10) Patent No.: US 8,463,287 B2
(45) Date of Patent: Jun. 11, 2013

(54) LOCATION REGISTRATION METHOD, APPARATUS, AND SYSTEM

(75) Inventors: Dong Ho Kim, Gyeonggi-do (KR); In Hoe Koo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 482 days.

(21) Appl. No.: 12/647,642

(22) Filed: Dec. 28, 2009

(65) Prior Publication Data

US 2010/0167755 A1 Jul. 1, 2010

(30) Foreign Application Priority Data

Dec. 29, 2008 (KR) .................. 10-2008-0135735

(51) Int. Cl.
*H04W 24/00* (2009.01)

(52) U.S. Cl.
USPC ............ 455/456.1; 455/436; 455/404.1; 455/435.1; 455/432.1; 455/574; 455/522

(58) Field of Classification Search
USPC ............ 455/436, 456.1, 404.1, 435.1, 432.1, 455/574, 522

See application file for complete search history.

(56) References Cited

U.S. PATENT DOCUMENTS

| | | | | |
|---|---|---|---|---|
| 2005/0107083 A1* | 5/2005 | Rager et al. | ............... | 455/435.1 |
| 2006/0172737 A1* | 8/2006 | Hind et al. | ............... | 455/435.2 |
| 2007/0298795 A1* | 12/2007 | Zinn et al. | ............... | 455/435.1 |
| 2010/0075658 A1* | 3/2010 | Hou et al. | ............... | 455/422.1 |
| 2010/0099399 A1* | 4/2010 | Nayak et al. | ............... | 455/422.1 |

FOREIGN PATENT DOCUMENTS

KR 2004-69573 8/2004

* cited by examiner

*Primary Examiner* — Kwasi Karikari (74) *Attorney, Agent, or Firm* — Cha & Reiter, LLC (57) ABSTRACT

A location registration method, apparatus, and system protects against unnecessary power waste by a mobile terminal. The location registration method includes receiving a location registration accept message from a connected network in response to a location registration request message; comparing a connected network information contained in the location registration accept message with a home network information stored in the mobile terminal; and determining, if the connected network information is different from the home network information, whether or not to perform a home network search based on a home network presence indicator contained in location registration accept message. Battery usage of the mobile terminal can be decreased, as well as the energy spent for recharging the battery of the mobile terminal.

22 Claims, 4 Drawing Sheets

LOCATION REGISTRATION METHOD, APPARATUS, AND SYSTEM

CLAIM OF PRIORITY

This application claims priority from an application entitled "LOCATION REGISTRATION METHOD, APPARATUS, AND SYSTEM" filed in the Korean Intellectual Property Office on Dec. 29, 2008 and assigned Ser. No. 10-2008-0135735, the contents of which are incorporated herein by reference in its entirety.

BACKGROUND OF THE INVENTION

1. Field of the Invention

The present invention relates to wireless communications and, in particular, to a location registration method, apparatus, and system for preventing an unnecessary waste of power for a mobile terminal.

2. Description of the Related Art

In order to use the voice and data communication services such as voice call service, text messaging service, video communication service, and Internet access service, a communication terminal first connects to a network providing the corresponding service. In case of the mobile terminal, there is a network selection that is the most suitable for communication at the current location of the mobile terminal.

Typically, the mobile terminal registers with a network of a specific carrier providing the wireless communication service, and the network with which the mobile terminal registers initially is called a home network, or Home Public Land Mobile Network (HPLMN). Due to the mobility characteristic inherent to mobile terminals, such device can roam far outside of the HPLMN, as well as within the HPLMN. When the mobile terminal leaves its HPLMN, the mobile terminal can roam and register with a visited network, or Visited PLMN (VPLMN), to access for communication services. The function for the mobile terminal to access the service of another network, which is not its home network, is typically referred to as a roaming service. The roaming services can be classified into two categories: international roaming and national roaming. The international roaming refers to the ability for the mobile terminal, when in a foreign country to access a foreign service provider's network. On the other hand, national roaming refers to the ability to move from one mobile operator to another within the same country. In case of the national roaming, the mobile terminal performs a home network search periodically according to a predetermined standard rule while it is being served by the visited network. During the home network search process, the mobile terminal performs scanning periodically even when the home network does not exist at the current location. When one is outside of the country, the repeated scannings are also a complete waste of time and energy. Such a useless home network search causes unnecessary power consumption, shortening battery life and wasting resources to generate electricity to recharge batteries that have been weakened by this process.

In the meantime, maximizing power utilization efficiency is one of the key issues for battery-powered mobile terminals. With the diversification of the supplementary functions integrated in the mobile terminal, the use of mobile terminal increases and thus the efficient power management in the power-constrained mobile terminal is becoming a more significant issue. In addition, with increasing proof that the use of fossil fuels to generate electricity is contributing to the problem of global warming, there is therefore a need to develop a location registration method for a mobile terminal that is capable of preventing an unnecessary power waste especially when the mobile terminal is roaming. Considering that mobile terminal use may one day soon comprises most of the world's population, the energy savings would be significant.

SUMMARY OF THE INVENTION

The present invention provides a location registration method, apparatus, and system that minimizes power consumption of a mobile terminal, particularly when outside of one's Home Public Land Mobile Network (HPLMN).

Also, the present invention provides a location registration method, apparatus, and system that protects against an unnecessary power waste by the mobile terminal.

In accordance with an exemplary embodiment of the preset invention, a location registration method for a mobile terminal includes receiving a location registration accept message from a connected network in response to a location registration request message; comparing a connected network information contained in the location registration accept message with a home network information stored in the mobile terminal; and determining, if the connected network information is different from the home network information, whether or not to perform a home network search based on a value of a home network presence indicator contained in location registration accept message.

In accordance with another exemplary embodiment of the present invention, a location registration apparatus of a mobile terminal includes a radio frequency unit which exchanges signals related to registration and home network search with a connected network; a storage unit which stores a home network information of the mobile terminal; a control unit which compares a connected network information contained in a location registration accept message received from the connected network with a home network information stored in the storage unit in order to determine whether or not the connected network information is different from the home network information, and whether to perform a home network search based on value of a home network presence indicator contained in location registration accept message.

In accordance with still another exemplary embodiment of the present invention, a location registration system includes a mobile terminal which registers with a network for accessing a specific service; a home network with which the mobile terminal is registered initially; and a visited network to which the mobile term is connected currently, wherein the visited network receives a location registration request message transmitted by the mobile terminal and sends a location registration response message containing a home network presence indicator to the mobile terminal in response to the location registration request message, and the mobile terminal determines whether or not to perform a home network search process based a value on the home network presence indicator.

The described features, advantages, and characteristics of the invention may be combined in any suitable manner in one or more of the exemplary embodiments. One skilled in the relevant art will recognize that the invention may be practiced without one or more of the specific features or advantages of a particular exemplary embodiment. In other instances, additional features and advantages may be recognized in certain embodiments that may not be present in all exemplary embodiments of the invention. These features and advantages of the present invention will become more fully apparent from the following description and appended claims, or may be learned by the practice of the invention as set forth hereinafter.

BRIEF DESCRIPTION OF THE DRAWINGS

The above features and advantages of the present invention will become more apparent to a person of ordinary skill in the art from the following detailed description in conjunction with the accompanying drawings, in which.

DETAILED DESCRIPTION

Exemplary embodiments of the present invention are described herein in detail with reference to the accompanying drawings. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

Figure 1A:
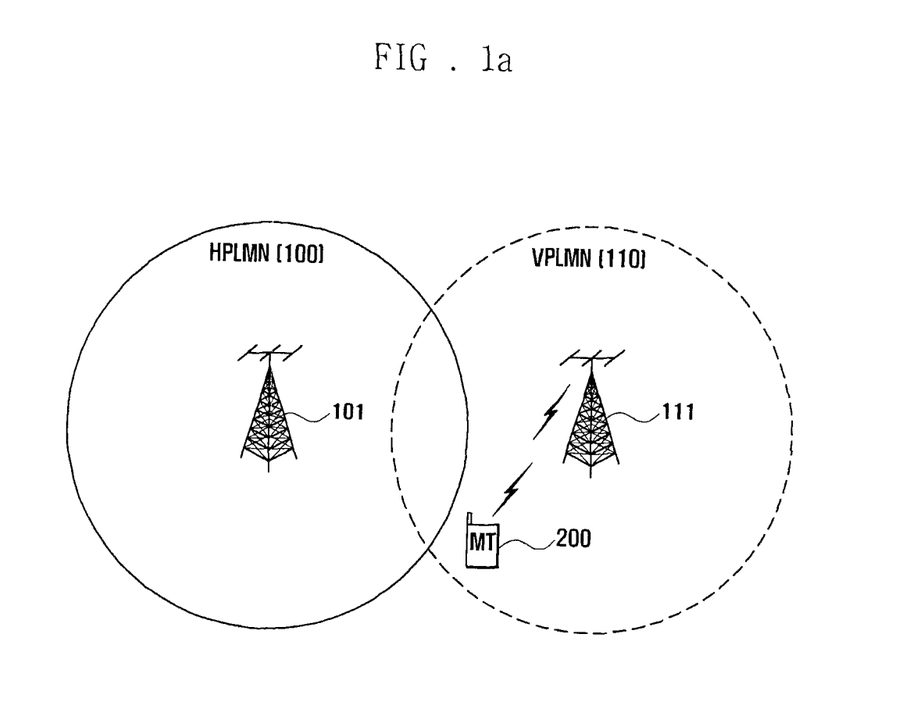
FIGS. 1a and 1b are schematic diagrams illustrating a mobile communication system to which a location registration method according to an exemplary embodiment of the present invention is applied.
Figure 1B:
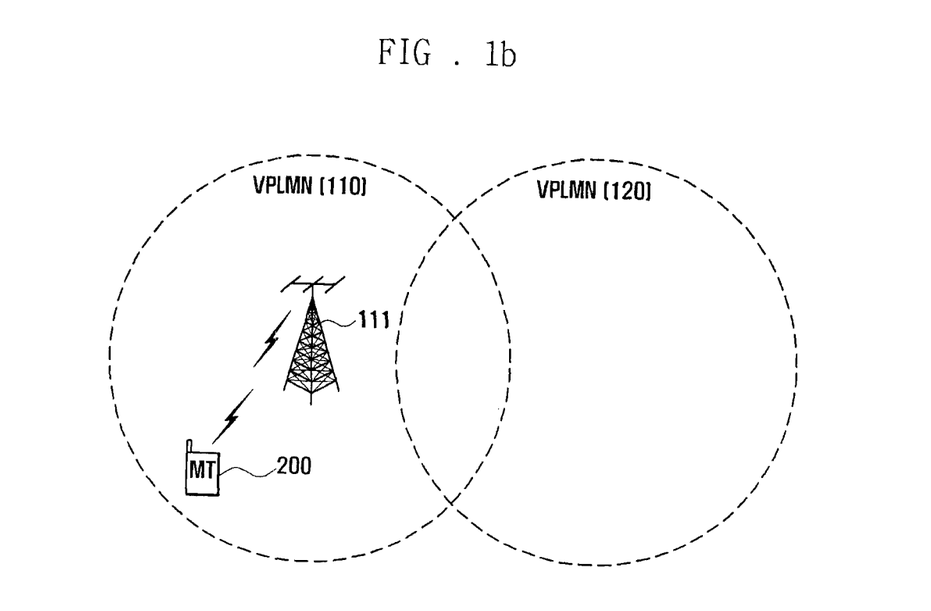

FIGS. 1a and 1b are schematic diagrams illustrating a mobile communication system to which a location registration method according to an exemplary embodiment of the present invention is applied. In order to simplify the explanation, it is assumed that the networks 100, 110, and 120 are different service providers' networks corresponding to radio coverage areas of respective base stations, the radio coverage areas overlapping as shown in FIGS. 1a and 1b. Although two overlapped networks are depicted in each of FIGS. 1a and 1b, a person of ordinary skill in the art should appreciate that the present invention is not limited in numbers of service providers' networks and/or overlapping shape.

As shown in FIG. 1a, a HPLMN 100 established by a base station 101 belonged to a home service provider's network of a Mobile Terminal (MT) 200 and a VPLMN 110 established by a base station 111 belonged to another service provider's network are overlapped, and the MT 200 is served in its current location by the visited network base station 111 in the VPLMN 110. Since the MT 200 attempts HPLMN preferred access and is located near the HPLMN 100, it can connect the HPLMN 100 with a small movement toward the HPLMN 100. The MT 200 performs a location update procedure with the VPLMN 110 and starts an HPLMN timer upon receipt of a location update accept message from the VPLMN 100. The MT 200 performs HPLMN search at each timer expiry. If the HPLMN is found then the MT 200 goes back to the HPLMN 100.

In FIG. 1b, the MT 200 is attached to the VPLMN 110 but there is no HPLMN in proximity. In this case, there is no possibility to find the HPLMN in the HPLMN search. Accordingly, whenever the MT 200 performs the PLMN search, it consumes power unnecessarily, as there is not a possibility that a small movement of the MT could cause the HPLMN to be within range of the MT. In order for the MT 200 to omit the unnecessary HPLMN search, the MT 200 receives a message indicating of the absence of the HPLMN in the location update procedure with the VPLMN 110. If the HPLMN absence indication message is received, the MT 200 does not perform the HPLMN search. That is, the MT 200 disables the HPLMN timer and stops transmission of the message for the HPLMN search. How the MT 200 receives the HPLMN absence indication message and determines whether to perform the HPLMN search depending on the HPLMN absence indication message is described hereinafter with reference to drawings. In the following description, the term "home network" is interchangeably used with "HPLMN", the term "visited network" is interchangeably used with "VPLMN", and the term "mobile terminal" is interchangeably used with "MT".

Figure 2:
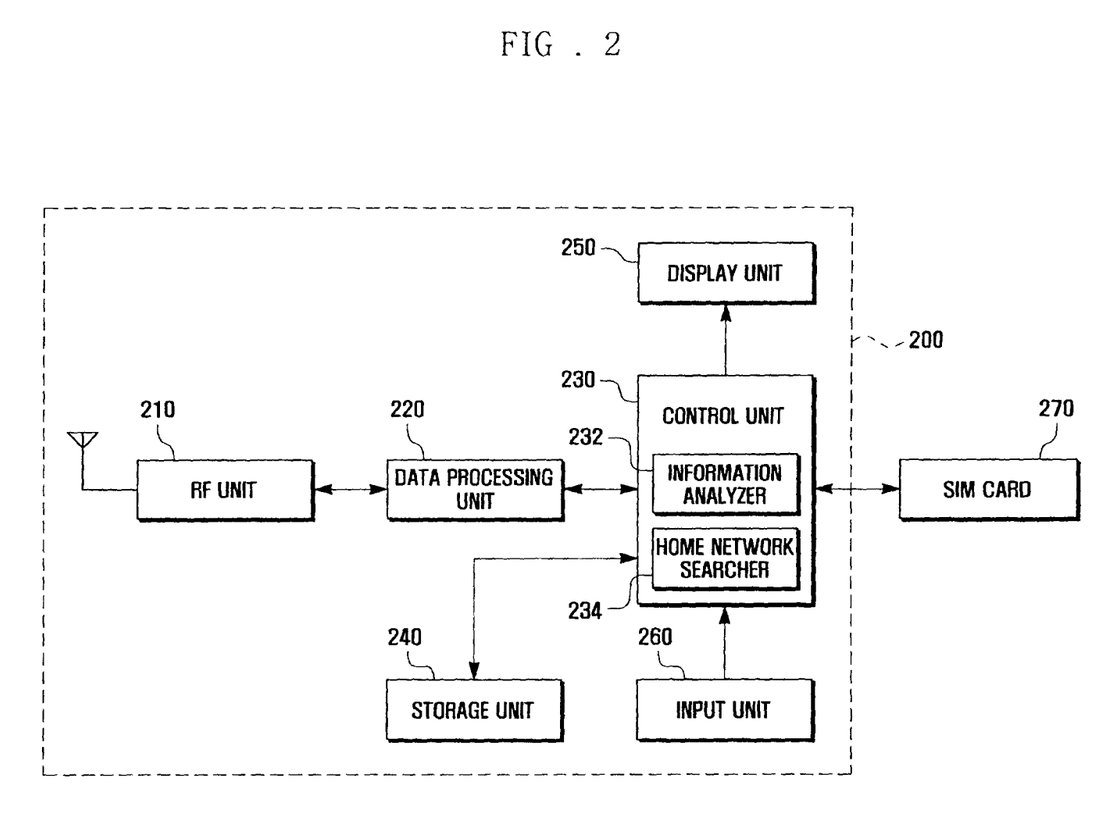
FIG. 2 is a block diagram illustrating one possible configuration of a mobile terminal according to an exemplary embodiment of the present invention.

FIG. 2 is a block diagram illustrating a configuration of a mobile terminal according to an exemplary embodiment of the present invention. Although the mobile terminal is depicted schematically with the function blocks necessary for wireless communication function, other function blocks can be included and or substitutes for some of the existing function blocks.

As shown in FIG. 2, the mobile terminal (MT) 200 preferably includes a Radio Frequency (RF) unit 210, a data processing unit 220, a control unit 230, a storage unit 240, a display unit 250, and an input unit 260. Additionally, a Subscriber Identity Module (SIM) card 270 may optionally be attached to the mobile terminal.

The RF unit 210 is responsible for wireless communication of the mobile terminal 200. The RF unit 210 includes an RF transmitter for up-converting and amplifying the transmission signal frequency and an RF receiver for low noise amplifying and down-converting the received radio signal, and exchanges control signals carrying the information including requests and subscriber identity information with the network. The data processing unit 220 is responsible for processing the data input through the input unit 260 and received by via the RF unit 210. The data processing unit 220 includes a transmitter for performing coding and modulation on the transmission signal and a receiver for performing demodulation and decoding on the signal received by the RF unit 210. That is, the data processing unit 220 may preferably include a MOdulator/DEModulator (MODEM) and a COder/DECoder (CODEC). The control unit 230 controls overall operations of the mobile terminal 200 and signaling among the internal function blocks of the mobile terminal 200. The control unit 230 can integrate the data processing unit 220. In an exemplary embodiment of the present invention, the control unit 230 can control to perform the HPLMN search process depending on the HPLMN information contained in the location registration accept message transmitted by a VPLMN in the location registration process while connected to the VPLMN. For this purpose, the control unit 230 includes an information analyzer 232 for checking the HPLMN information contained in the location registration accept message and a HPLMN searcher 234 for performing HPLMN search when the HPLMN information indicates the presence of the HPLMN.

The storage unit 240 stores application programs for executing supplementary functions of the mobile terminal 200 and the various types of data including the information related to the HPLMN search process. In FIG. 2, the device identity information is stored preferably in at least one of the SIM card 270 and the storage unit 240. The display unit 250 displays video data generated while the application programs are operating in the mobile terminal 200 and the user data input by manipulation of the keys of the input unit 260. The display unit can be implemented with a Liquid Crystal Display (LCD) supporting touchscreen function, or any type of thin screen technology film currently in existence or which becomes available. In the case of the touchscreen, the display unit 250 can work as a part of the input unit 260. The input unit 260 is provided with a plurality of alphanumeric and function keys so as to transfer the alphabetic and numeric data and function execution command corresponding to the keys selected by the user to the control unit 230. The input unit 260 can be implemented, for example, with at least one of a touchpad and keypad.

The SIM card 270, if present, can be implemented in the form of a detachable card having a microprocessor and a memory chip. The SIM card 270 stores the subscriber information (such phonebooks, password, and billing information), International Mobile Subscriber Identity (IMSI) which is a unique identifier allocated to the subscriber, and a Temporary Mobile Subscriber identity (TMSI) and/or a Packet Temporary Mobile Subscriber Identity (P-TMSI) allocated for the mobile terminal to receive the service provided by the VPLMN. As aforementioned, the subscriber identity information is stored in the SIM card in an exemplary embodiment of FIG. 2, however, the present invention is not limited thereto. The SIM card is of the user subscription to the Global System for Mobile Telecommunications (GSM) network and contains information related to subscriber authentication, billing, and security that enables access to the services provided by the subscribed operator's network. The SIM card can be substituted by a UMTS SIM (USIM) integrating the SIM card function and the Universal Integrated Circuit Card (UICC) for use in $3^{rd}$ Generation mobile communication network. However, a person of ordinary skill in the art should understand that the claimed invention is not limited to $3^{rd}$ generation mobile communication networks.

In order to access the services provided by a network, the mobile terminal 200 has to perform a registration procedure with one of the IMSI, TMSI, and P-TMSI stored in the SIM card 270. If the mobile terminal 200 is authenticated with the subscriber information by the network, the mobile terminal can then register with the network in order to access the service provided by the network. The procedure is called Location Update Procedure. Whether the network with which the mobile terminal 200 has registered with is the home network or the visited network can be checked using the home network information. The home network information is contained in the IMSI. Also, the mobile terminal 200 receives the current network information of the currently connected network. The mobile terminal 200 checks whether or not it is being served by a network via national roaming. If the mobile terminal is served by the network by national roaming, the mobile terminal then performs the home network search after the location registration procedure. Table 1 shows a format of the IMSI.

TABLE 1

| MCC | MNC | MSIN |
|---|---|---|

The IMSI as a unique identifier allocated to the mobile subscriber is 15 digits. The 15-digit IMSI is composed of 3-digit Mobile Country Code (MCC), and 2 or 3-digit Mobile Network Code (MNC), and 10-digit Mobile Subscriber Identifier Number (MSIN). The MCC and MNC are allocated per the service provider and used to identify the home network of the subscriber. When the mobile terminal is connected to the visited network, the visited network can query the home network by analyzing the maximum 6 digits of the MCC and MNC. In an exemplary embodiment of the present invention, the serving network preferably obtains the information on the home network of the mobile terminal 200 by referencing the MCC and MNC of the IMSI provided by the mobile terminal 200. If the current serving network is not the home network of the mobile terminal 200, i.e. the mobile terminal is connected to a visited network (particularly in the national roaming network which is identical with the home network in MCC but not in MNC), the visited network checks for the presence of the home network by using the home network information and the location information of the mobile terminal 200 and notifies the mobile terminal 200 of the presence or absence of the home network. The visited network can locate the mobile terminal 200 by checking whether the cell received the location registration request message transmitted by the mobile terminal. The home network presence notification procedure is described in more detail with reference to FIG. 3. The MSIN is used to identify the subscriber unlike the MCC and MNC which is used to identify the service network.

Figure 3:
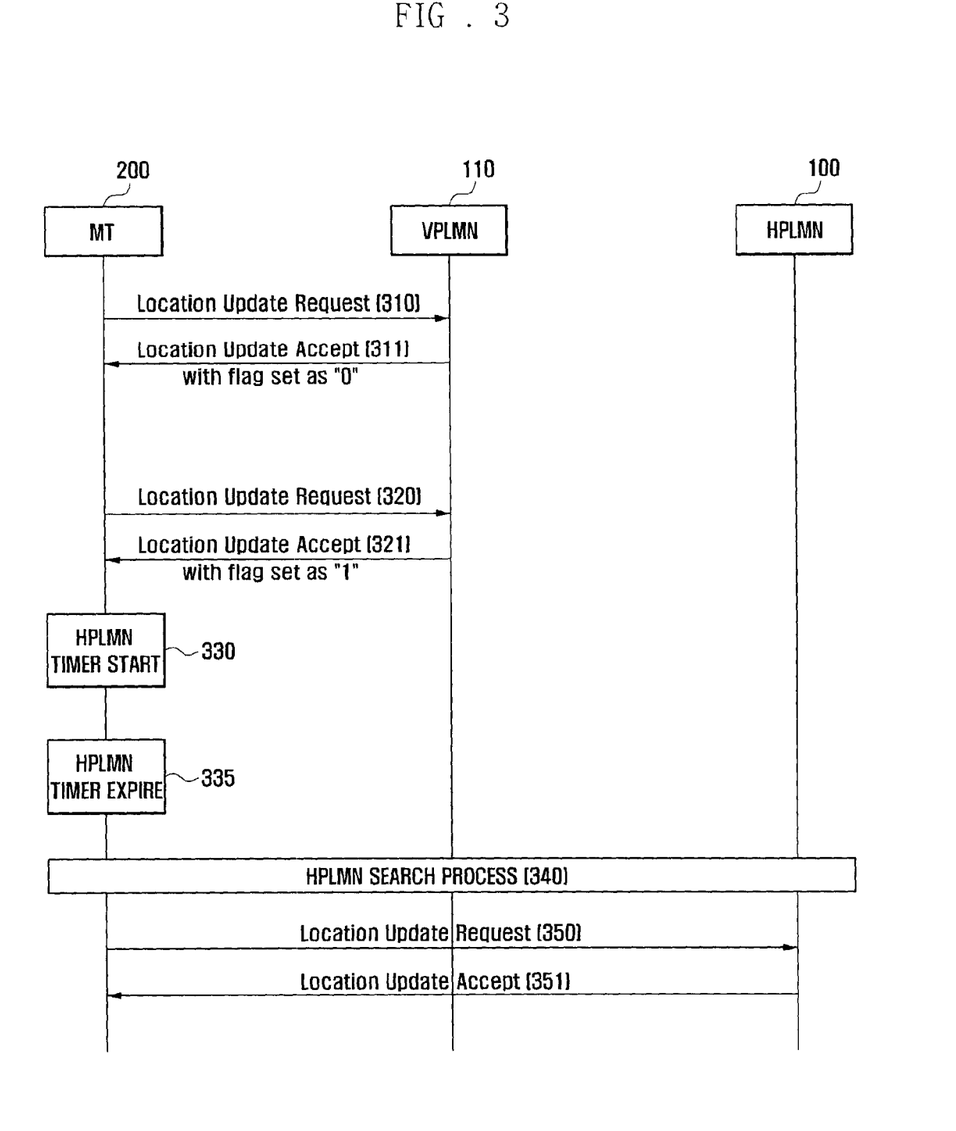
FIG. 3 is a sequence diagram illustrating operations of MT, VPLMN, and HPLMN in a location registration procedure according to an exemplary embodiment of the present invention.

FIG. 3 is a sequence diagram illustrating operations of MT, VPLMN, and HPLMN in a location registration procedure according to an exemplary embodiment of the present invention.

Referring now to FIG. 3, the mobile terminal 200 connects to the VPLMN 110 (see FIGS. 1a and 1b) and then sends a Location Update Message to the VPLMN 110 periodically (310). The Location Update message preferably includes the MCC and MNC information of the mobile terminal 200 and transmitted in the message format specified in the international standard. Since the Location Update Request and Accept message format is well-known and outside of the scope of the present invention, a detailed description on the message format is omitted, as a person of ordinary skill in the art does not need such an explanation herein. If the Location Update Request message is received, the VPLMN 110 checks the MCC and MNC contained in the Location Update Request message and recognizes that the VPLMN 110 is not the home network of the mobile terminal 200. At this time, the VPLMN 110 checks the current location of the mobile terminal 200 by locating the base station which received the Location Update Request message and generates information on the home network of the mobile terminal 200. Since each base station has the information on its neighboring base stations, the VPLMN 110 can determine whether or not the home network of the mobile terminal 200 is present around the current location (for example, the home network can be adjacent the current VPLMN, overlap with the current VPLMN, or there could be one or more VPLMNs in between the current location and the home network) of the mobile terminal 200 based on the neighboring base station information.

If it is determined that the home network of the mobile terminal 200 is not present (i.e. not in proximity, as discussed above) around the current location of the mobile terminal 200, the VPLMN 1110 sends a Location Update Accept message with a flag set to 0 to the mobile terminal 200 (311). The flag is set to 0 for indicating the absence of the home network around the current location of the mobile terminal 200 and set 1 for indicating the presence of the home network around the current location of the mobile terminal 200. Table 2 shows the information carried by the Location Update Accept message.

TABLE 2

| IEI | Information Element | Type | Presence | Format | Length |
|---|---|---|---|---|---|
| | Mobility Management Protocol Discriminator | Protocol Discriminator | M | V | ½ |
| | Skip Indicator | Skip Indicator | M | V | ½ |
| | Location Update Accept message type | Message type | M | V | 6 |
| | Location area identification | Local Area Identification | M | V | 3-10 |
| 17 | Mobile Identity | Mobile Identity | O | TLV | 3-10 |
| A1 | Follow on proceed | Follow on proceed | O | T | 1 |
| A2 | CTS permission | CTS permission | O | T | 1 |
| 4A | Equivalent PLMNs | PLMN list | O | TLV | 5-47 |
| 34 | Emergency Number List | Emergency Number List | O | TLV | 5-50 |

As shown in Table 2, the Location Update Accept message includes a plurality of Information Elements including information about connected network. In more detail, the Location Update Accept message includes a ½-byte (4 bits) mandatory "Mobility Management Protocol Discriminator" information element for discriminating the layer 3 protocol, a ½-byte mandatory "Skip Indicator" information element for indicating ignorance of the message, a 1-byte mandatory "Location Updating Accept Message Type" information element for indicating acceptance of the location update, a 6-byte mandatory "Location Area Identification" information element for carrying the information about the network transmitting the location update accept message, a 3 to 10-byte optional "Local Area Identification" information element containing the information for identify the mobile terminal such as software version information (IMEISV) and IMSI or TMSI/P-TMSI, a 1-byte optional "Follow on proceed" information element containing the information on whether the network wants the mobile terminal to establish the MM connection through the same RR connection, a 1-byte optional "CTS permission" information element containing the information on whether the network permits the mobile terminal to use the GSM radio telephony system, a 5 to 47-byte optional "Equivalent PLMNs" information element to provide the mobile terminal with the information on the equivalent networks, a 5 to 50-byte optional "Emergency Number List" information element containing the emergency number list having the same MCC as the mobile terminal 200.

The "Location area identification" information element is 6-byte long to carry the home network presence information and formatted as shown in Table 3.

TABLE 3

| | | | Bit | | | | | |
|---|---|---|---|---|---|---|---|---|
| 8 | 7 | 6 | 5 | 4 | 3 | 2 | 1 | Octet |
| Location Area Identification IEI | | | | | | | | 1 |
| MCC digit 2 | | | | MCC digit 1 | | | | 2 |
| MNC digit 3 | | | | MCC digit 3 | | | | |
| MNC digit 2 | | | | MNC digit 1 | | | | 4 |
| LAC | | | | | | | | 5 |
| LAC (Continued) | | | | | | | | 6 |
| HSRCH | | | | Spare | | | | 7 |

As shown in Table 3, the "Location area identification" information element is composed of 6 bytes including a 3-byte PLMN code, a 2-byte Location Area Code, and a 1-bit HPLMN Search (HSRCH) flag in the last octet. The HPLMN Search (HSRCH) flag can be set differently depending on the configuration, and table 4 shows description of an exemplary HSRCH flag.

TABLE 4

| HSRCH (octet 7) | |
|---|---|
| Bit | |
| 1 | |
| 0 | Doesn't need HPLMN Search |
| 1 | Need HPLMN Search |

Referring now to Table 4, when the home network is present around (in proximity to) the current location of the mobile terminal 200, the HSRCH flag is set to 1. In contrast, if the home network is absent around the current location of the mobile terminal 200, the HSRCH flag is set to 0.

In FIG. 3, the VPLMN 110 determines that the home network of the mobile terminal 200 is not present (in proximity) around the current location of the mobile terminal 200 such that the VPLMN sends the Location Update Accept message with the HSRCH flag set to 0 at step 311. If the Location Update Accept message with the HSRCH flag set to 0 is received, the mobile terminal 200 does not initiate the HPLMN search timer, unlike the conventional Location Update procedure, in which the mobile terminal 200 checks the PLMN code (i.e. the MCC and MNC) of the visited network 110 and, if the MCC code is identical with that of the home network but the MNC is not identical with that of the home network, starts the HPLMN search timer. Conventionally, the HPLMN search timer is initiated whenever the HPLMN search fails such that the mobile terminal 200 repeats the HPLMN search until the HPLMN 100 is found, resulting in waste of power. In an exemplary embodiment of the present invention, the VPLMN 110 informs the mobile terminal 200 of the HPLMN presence information by transmission of the Location Update Accept message such that the mobile terminal 200 does not perform the HPLMN search when the HPLMN is not present around the current location of the mobile terminal 200, so as to thereby prevent an unnecessary waste of power.

When the Location Update Request message transmission condition is fulfilled (e.g. when the mobile terminal 200 powers on to request for the location registration initially, is changed in location, or detects a periodic Location Update Request message transmission time), the mobile terminal 200 transmits the Location Update Request message to the visited network 110. That is, the mobile terminal 200 sends the Location Update Request message to the visited network 110 (320). Upon receipt of the Location Update Request message, the visited network 110 then checks whether the home network of the mobile terminal 200 is present around the current location of the mobile terminal 200 and generates the Location Update Accept message with the HSRCH flag set depending on the whether the home network is present or not. If it is determined that the home network of the mobile terminal 200 is present around the current location of the mobile terminal 200 as shown in FIG. 1a, the visited network 110 sends the Location Update Accept message with the HSRCH flag set to 1 to the mobile terminal 200 (321). It is possible that the VPLMN 110 can access or has stored the identities of networks in proximity to itself and use this information to notify the MT 200 as to whether or not the home network for the MT 200 is within proximity or not to scan for the HPLMN of the MT 200.

With continued reference to FIG. 3, upon receipt of the Location Update Accept message, the mobile terminal 200 checks the PLMN code of the visited network 200 and the HSRCH flag contained in the Location Update Accept message to determine whether or not to perform the HPLMN search. In FIG. 3, it is assumed that the visited network 110 is identified as a national roaming network. The mobile terminal 200 recognizes that the visited network 110 is a national roaming network based on the PLMN code. Also, the mobile terminal 200 recognizes that the home network is present (in proximity) around the current location of the mobile terminal based on the HSRCH flag being set to 1. When the visited network 110 is the national roaming network and the home network is present around the current location, the mobile terminal starts the HPLMN search timer and waits until the HPLMN search timer expires (330). If the HPLMN search timer expires, the mobile terminal 200 detects the expiry of the HPLMN search timer (335) and starts the HPLMN search process (340). In the HPLMN search process, the mobile terminal 200 scans all the frequencies to receive the network information broadcasted by individual base stations, and decodes the received network information to acquire the home network information. If the home network 100 is found through the HPLMN search process, the mobile terminal 200 then sends a Location Update Request message to the home network 100 (350). Upon receipt of the Location Update Request message transmitted by the mobile terminal 200, the home network 100 authenticates the mobile terminal 200 based on the information contained in the Location Update Request message. If it is verified that the mobile terminal 200 is a valid subscriber's terminal, at (351) the home network 100 sends a Location Update Accept message to the mobile terminal 200. At this time, the Location Update Accept message is transmitted with the HSRCH flag or with the HSRCH flag set to 0. Upon receipt of the Location Update Accept message transmitted by the home network 100, the mobile terminal 200 checks the network information and recognizes that it is registered with the home network, thereby disabling the HPLMN search function.

Until now, the location registration method has been described with the exchange of the Location Update Request message and the Location Update Accept message between the mobile terminal and a network for Circuit Switched (CS) service, i.e. voice call service. In order to access a more advanced network (e.g. the Universal Mobile Telecommunication System; UMTS) supporting the Packet Switched (PS) service, i.e. the packet call service, as well as the CS service, the Location Registration procedure should be performed in both the CS domain and the PS domain for the CS and PS services. The registrations for the CS and PS domain services can be performed simultaneously or separately. Since the simultaneous and separate CS/PS domain registration procedures are well-known to the person of ordinary skill in the art, detailed descriptions thereof are omitted. If a Routing Area Update Request message or an Attach Request message for the PS domain registration is received from the mobile terminal, the network verifies the subscriber's identity and, if the subscriber is permitted for the registration, transmits a Routing Area Update Accept message or an Attach Accept message to the mobile terminal. In case that the connected network is a visited network, the Routing Area Update Accept message and the Attach Accept message contain the home network presence information as aforementioned Location Update Accept message. Table 5 shows an example of the information carried by the Routing Area Update Accept message transmitted by the network. Although not described, the Attach Accept message contains the "Routing area identification" information element as the Routing Area Update Accept message.

TABLE 5

| IEI | Information Element | Type | Presence | Format | Length |
|---|---|---|---|---|---|
|  | Protocol discriminator | Protocol discriminator | M | V | ½ |
|  | Skip indicator | Skip Indicator | M | V | ½ |
|  | Routing area update accept identity | Message type | M | V | 1 |
|  | Force to standby | Force to standby | M | V | ½ |
|  | Update result | Update result | M | V | ½ |
|  | Periodic RA update timer | GPRS Timer | M | V | 1 |
|  | Routing area identification | Routing area identification | M | V | 7 |
| 19 | P-TMSI signature | P-TMSI signature | O | TV | 4 |
| 18 | Allocated P-TMSI | Mobile identity | O | TLV | 7 |
| 23 | Mobile identity | Mobile identity | O | TLV | 7-10 |
| 26 | List of Receive N-PDU Numbers | Receive N-PDU Number list | O | TLV | 4-19 |
| 17 | Negotiated Ready timer value | GPRS Timer | O | TV | 2 |
| 25 | GMM cause | GMM cause | O | TV | 2 |
| 2A | T3302 value | GPRS Timer 2 | O | TLV | 3 |
| 8C | Cell Notification | Cell Notification | O | T | 1 |
| 4A | Equivalent PLMNs | PLMN List | O | TLV | 5-47 |
| 32 | PDP context status | PDP context status | O | T | 4 |
| B | Network feature support | Network feature support | O | TLV | 1 |
| 34 | Emergency Number List | Emergency Number List | O | TLV | 5-50 |
| 35 | MBMS context status | MBMS context status | O | TV | 2-18 |
| A | Requested MS Information | Requested MS Information | O | TV | 1 |
| 37 | T3319 value | GPRS Timer 2 | O | TLV | 3 |
| 38 | T3323 value | GPRS Timer 2 | O | TLV | 3 |

As shown in Table 5, the Routing Area Update Accept message format specified in the standard includes the "Routing area identification" information element containing the connected network information. The "Routing area identification" information element is 7 bytes and formatted as shown in table 6.

TABLE 6

| 8 | 7 | 6 | 5 | 4 | 3 | 2 | 1 | Octet |
|---|---|---|---|---|---|---|---|---|
| Location Area Identification IEI ||||||||  1 |
| MCC digit 2 |||| MCC digit 1 |||| 2 |
| MNC digit 3 |||| MCC digit 3 |||| 3 |
| MNC digit 2 |||| MNC digit 1 |||| 4 |
| LAC |||||||| 5 |
| LAC (Continued) |||||||| 6 |
| RAC |||||||| 7 |
| HSRCH |||| Spare |||| 8 |

As shown in Table 6, the "Location area identification" information element is preferably composed of 7 bytes including a 3-byte PLMN code, a 3-Byte Location Area Code and Routing Area Code, and a 1-bit HPLMN Search (HSRCH) flag in the last octet. The HPLMN Search (HSRCH) flag can be set differently depending on the configuration, and Table 7 shows a description of an exemplary HSRCH flag.

TABLE 7

| HSRCH (octet 8) | |
|---|---|
| Bit | |
| 1 | |
| 0 | Doesn't need HPLMN Search |
| 1 | Need HPLMN Search |

Referring now to Table 7, when the home network is present around the current location of the mobile terminal 200, the HSRCH flag is set to 1. In contrast, if the home network is absent (not in proximity) around the current location of the mobile terminal 200, the HSRCH flag is set to 0. If the Routing Area Update Accept message with the HSRCH flag as formatted in table 7 is received, the mobile terminal 200 checks the HSRCH flag and determines, based on the HSRCH flag, whether to perform the home network search. Since the home network search determination process has been described above, detailed description thereon is omitted. A person of skill in the art also clearly should understand and appreciate that the setting of the flag to 1 to indicate proximity is not a limiting aspect of the present invention, as it could be that a flag set to 0 indicates this item.

Figure 4:
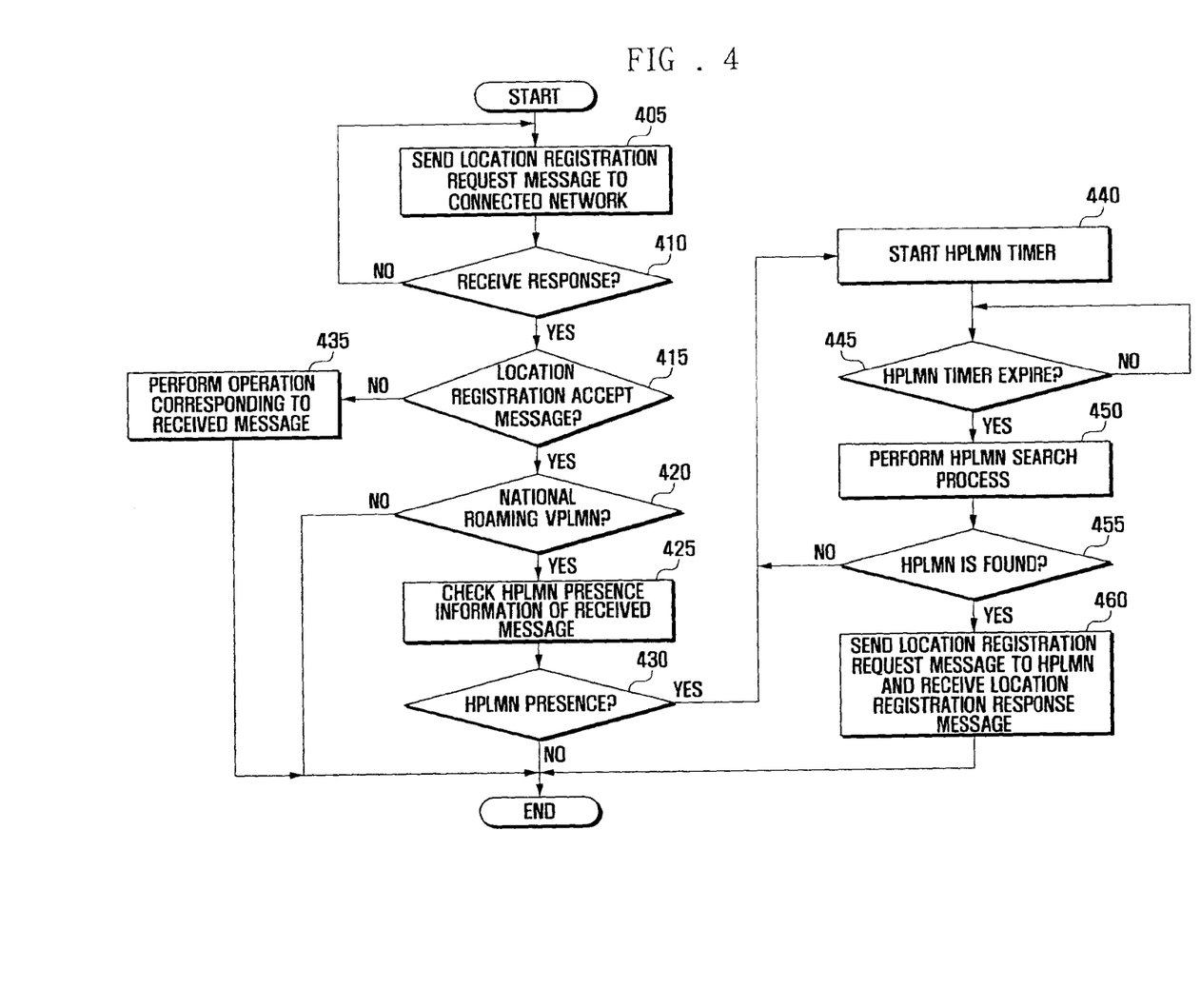
FIG. 4 is a flowchart illustrating an exemplary operation of a location registration method for a mobile terminal according to an exemplary embodiment of the present invention.

FIG. 4 is a flowchart illustrating a location registration method for a mobile terminal according to an exemplary embodiment of the present invention.

Referring now to FIG. 4, if a location registration request condition is fulfilled, the control unit 230 of the mobile terminal 200 (see FIG. 2) transmits a Location Registration Request message to the currently connected network (405). The location registration request condition is fulfilled when the mobile terminal 200 powers on to request for the location registration initially or is changed in location, or a timer for periodic location registration expires. In the case of the initial registration after the power-on of the mobile terminal 200, the connected network is the network of which network information is stored on right before the mobile terminal 200 has switched off. In the exemplary embodiment of FIG. 4, the location registration request includes the Location Area Update Request for the CS domain service and the Routing Area Update Request and Attach Request for the PS domain service. Accordingly, the Location Registration Request message can be a message to request for the CS service registration or CS and PS services, i.e. one of the Location Update Request message, Routing Area Update Request message, and Attach Request message. These messages are represented are represented by the Location Registration Request message. After the transmission of the Location Registration Request message, the control unit 230 of the mobile terminal 200 determines whether a response message is received in response to the Location Registration Request message (410).

If a response message is received, at (415) the control unit 230 determines whether the response message is a Location Registration Accept message. If the response message is not the Location Registration Accept message, the control unit 230 performs an operation corresponding to the response message. For instance, the response message is a Location Registration Reject message, the control unit 230 can restrict the operation of the mobile terminal 200.

Still referring to FIG. 4, if the response message is the Location Registration Accept message, the control unit 230, particularly the information analyzer 232 of the control unit 230, determines whether the connected network is a VPLMN, particularly a national roaming VPLMN (420). At this time, the network type can be checked by comparing the PLMN code contained in the Location Registration Accept message, i.e. the MCC and MNC as shown in tables 3 and 6, with those stored in the SIM card 270. If the MCC code carried by the Location Registration Accept message is identical with that stored in the SIM card 270 but the MNC code carried by the Location Registration Accept message is different from that stored in the SIM card 270, the control unit 230 regards the connected network as a national roaming VPLMN. If it is determined that the connected network is a national roaming VPLMN, this affirmative determination means that the home network search is required and thus the control unit 230, particularly the information analyzer 232 of the control unit 230, checks the HPLMN information, i.e. the HSRCH flag (425). The control unit 230, particularly the information analyzer 232 of the control unit 230, determines the presence of the home network around the current location of the mobile terminal 200 depending on the value of the HSRCH flag (430). If it is determined that the home network is present around the current location of the mobile terminal 200, the control unit 230, particularly the HPLMN searcher 234 of the control unit 230, starts the HPLMN timer (440). Otherwise, if it is determined at (430) that the home network is absent around the current location of the mobile terminal 200, the control unit 230 ends the Location Registration procedure without starting the HPLMN timer. In this manner, the location registration method of the present invention can prevent the mobile terminal from performing unnecessary HPLMN searches in the area where the HPLMN is not present, thereby protecting against unnecessary waste of battery power for needless scanning.

At step (440), after starting the HPLMN timer, at step (445) the control unit 230, particularly the HPLMN searcher 234 of the control unit 230, determines whether or not the HPLMN timer has expired. If the HPLMN timer has expired, the control unit 230, particularly the HPLMN searcher 234 of the control unit 230, performs the HPLMN search process (450). In the HPLMN search process, the mobile terminal 200 scans all the frequencies to receive the network information broadcasted by individual base stations and decodes the received network information to acquire the home network information. Next, the control unit 230, particularly the HPLMN searcher 234 of the control unit 230, determines whether the HPLMN is found (455). If the HPLMN is found, the procedure goes to step 460 to send a Location Registration Request message to the HPLMN and receive a location Registration Response Message. Otherwise, if the HPLMN is not found, the procedure goes to step 440 to reset and start the HPLMN timer. At step 460, the control unit 230 transmits a Location Registration Request message to the home network and receives a Location Registration Accept message in response to the Location Registration Request message (460). As a consequence, the mobile terminal is connected to the home network.

As described above, the location registration method of the present invention is advantageous to avoid unnecessary wasted energy in the location registration procedure with the visited network. The location registration method of the present invention is capable of checking the presence of the home network around the current location of the mobile terminal such that the mobile terminal does not perform the home network search process in the area where the home network of the mobile terminal is not present (within proximity), resulting in protection of unnecessary power waste.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A location registration method for a mobile terminal, comprising:
   receiving a location registration accept message from a network connected to the mobile terminal in response to a location registration request message;
   comparing connected network information contained in the location registration accept message from the connected network with home network information stored in the mobile terminal; and
   determining, if the connected network information is different from the home network information, whether to perform a home network search based on home network presence information contained in the location registration accept message,
   wherein the search is performed when the home network presence information indicates that a home network is neighboring the connected network; otherwise the search is not performed.

2. The location registration method of claim 1, wherein each of the connected network information and the home network information comprises a Mobile Country Code (MCC) and a Mobile Network Code (MNC).

3. The location registration method of claim 2, wherein comparing the connected network information contained in the location registration accept message with the home network information stored in the mobile terminal comprises:
   comparing the MCC of the connected network information with the MCC of the home network information; and
   comparing the MNC of the connected network information with the MNC of the home network information.

4. The location registration method of claim 3, further comprising: judging that the connected network is a network requiring the home network search, if the MCC of the connected network information is identical with the MCC of the home network information and the MNC of the connected network information is different from the MNC of the home network information.

5. The location registration method of claim 1, wherein determining whether to perform a home network search comprises:
   checking the home network presence indication information contained in the location registration accept message; and
   disabling a home network search timer if the home network presence information indicates an absence of the home network in proximity of the mobile terminal.

6. The location registration method of claim 1, wherein determining whether to perform a home network search comprises:
   checking the home network presence indication information contained in the location registration accept message;
   activating a home network search timer if the home network presence information indicates presence of the home network neighboring the connected network;
   performing the home network search process when the home network search timer expires; and
   registering with the home network if the home network is found in the home network search process.

7. The location registration method of claim 1, wherein the location registration accept message comprises at least one of a location area update accept message, a routing area update accept message, and an attach accept message.

8. The location registration method of claim 1, further comprising transmitting the location registration request message to the connected network, when at least one of a plurality of location registration conditions is fulfilled.

9. The location registration method of claim 8, wherein the plurality of location registration conditions include a powering-on of the mobile terminal, a change of location of the mobile terminal, and an expiry of a periodic location registration timer.

10. A location registration apparatus of a mobile terminal, comprising:
    a radio frequency unit which exchanges signals related to a registration and a home network search with a network connected to the mobile terminal;
    a storage unit which stores home network information of the mobile terminal; and
    a control unit which compares connected network information contained in a location registration accept message received from the connected network with home network information stored in the storage unit, and determines, if the connected network information is different from the home network information, whether to perform a home network search based on home network presence information contained in the location registration accept message;
    wherein the search is performed when the home network presence information indicates that a home network is neighboring the connected network; otherwise, the search is not performed.

11. The location registration apparatus of claim 10, wherein each of the connected network information and the home network information comprises a Mobile Country Code (MCC) and a Mobile Network Code (MNC).

12. The location registration apparatus of claim 11, wherein the control unit compares the MCC and MNC of the connected network information with the MCC and MNC of the home network information and determines, if the MCC of the connected network information is identical with the MCC of and the home network information and the MNC of the connected network information is different from the MNC of home network information, that the connected network is a network requiring the home network search.

13. The location registration apparatus of claim 10, wherein the control unit checks the home network presence indication information contained in the location registration accept message and disables a home network search timer if the home network presence information indicates an absence of the home network in proximity of the mobile terminal.

14. The location registration apparatus of claim 10, wherein the control unit checks the home network presence indication information contained in the location registration accept message; activates, if the home network presence information indicates presence of the home network, a home network search timer; performs, when the home network search timer expires, the home network search process; and registers with the home network when the home network is found through the home network search process.

15. The location registration apparatus of claim 10, wherein the location registration accept message comprises at least one of a location area update accept message, a routing area update accept message, and an attach accept message.

16. A location registration system comprising:
    a mobile terminal which registers with a network for accessing a specific service;
    a home network with which the mobile terminal is registered initially; and
    a visited network to which the mobile term is connected, wherein the visited network receives a location registration request message transmitted by the mobile terminal and sends a location registration response message containing home network presence information to the mobile terminal in response to the location registration request message, and the mobile terminal determines whether to perform a home network search process based on the home network presence information, the search being performed when the home network presence information indicates that a home network is neighboring the connected network; otherwise, the search is not performed.

17. The location registration system of claim 16, wherein the mobile terminal checks the home network presence indication information contained in the location registration accept message and disables a home network search timer if the home network presence information indicates an absence of the home network in proximity of the mobile terminal.

18. The location registration system of claim 16, wherein the mobile terminal checks the home network presence indication information contained in the location registration accept message; activates a home network search timer if the home network presence information indicates presence of the home network neighboring the connected network; performs the home network search process when the home network search timer expires; and registers with the home network if the home network is found in the home network search process.

19. The location registration system of claim 16, wherein the location registration accept message comprises at least one of a location area update accept message, a routing area update accept message, and an attach accept message.

20. The location registration method of claim 1, the home network presence information comprises a value, wherein the value includes "0" indicating an absence of the home network around the location of the mobile terminal and "1" indicating a presence of the home network around the location of the mobile terminal.

21. The location registration apparatus of claim 10, the home network presence information comprises a value, wherein the value includes "0" indicating an absence of the home network around the location of the mobile terminal and "1" indicating a presence of the home network around the location of the mobile terminal.

22. The location registration system of claim 16, the home network presence information comprises a value, wherein the value includes "0" indicating an absence of the home network around the location of the mobile terminal and "1" indicating a presence of the home network around the location of the mobile terminal.

* * * * *

UNITED STATES PATENT AND TRADEMARK OFFICE
CERTIFICATE OF CORRECTION

PATENT NO. : 8,463,287 B2
APPLICATION NO. : 12/647642
DATED : June 11, 2013
INVENTOR(S) : Dong-Ho Kim et al.

It is certified that error appears in the above-identified patent and that said Letters Patent is hereby corrected as shown below:

In the Claims

Column 14, Claim 16, Line 67 should read as follows:
--…a visited network to which the mobile terminal is connected…--

Signed and Sealed this
Thirtieth Day of July, 2013

Teresa Stanek Rea
*Acting Director of the United States Patent and Trademark Office*